(12) United States Patent
Peeters

(10) Patent No.: US 9,464,696 B2
(45) Date of Patent: Oct. 11, 2016

(54) CONTINUOUS VARIABLE TRANSMISSION SYSTEM AND USE THEREOF

(71) Applicant: Ivan Peeters, Beveren (BE)

(72) Inventor: Ivan Peeters, Beveren (BE)

( * ) Notice: Subject to any disclaimer, the term of this patent is extended or adjusted under 35 U.S.C. 154(b) by 0 days.

(21) Appl. No.: 14/349,591

(22) PCT Filed: Oct. 2, 2012

(86) PCT No.: PCT/EP2012/069426
§ 371 (c)(1),
(2) Date: Apr. 3, 2014

(87) PCT Pub. No.: WO2013/050353
PCT Pub. Date: Apr. 11, 2013

(65) Prior Publication Data
US 2014/0248990 A1  Sep. 4, 2014

(30) Foreign Application Priority Data

Oct. 3, 2011 (EP) .................................... 11183736

(51) Int. Cl.
*F16H 29/16* (2006.01)
*F16H 3/76* (2006.01)
*F16H 3/70* (2006.01)

(52) U.S. Cl.
CPC . *F16H 3/70* (2013.01); *F16H 3/76* (2013.01)

(58) Field of Classification Search
CPC ............. F16H 29/16; F16H 3/76; F16H 3/70
See application file for complete search history.

(56) References Cited

U.S. PATENT DOCUMENTS

| 5,029,486 | A | * | 7/1991 | Mercat ........................... 74/117 |
| 5,674,144 | A | * | 10/1997 | Wiley ........................... 475/170 |
| 5,797,822 | A | * | 8/1998 | Green ........................... 475/306 |
| 5,997,427 | A | | 12/1999 | Fenton |
| 2008/0076617 | A1 | | 3/2008 | Lee |

FOREIGN PATENT DOCUMENTS

| EP | 1170526 A2 | 1/2002 |
| GB | 1123341 A * | 8/1968 ............. F16H 29/16 |

OTHER PUBLICATIONS

International Search Report and Written Opinion of the International Searching Authority for International Application No. PCT/EP2012/069426, mailed on Jan. 21, 2013.

* cited by examiner

*Primary Examiner* — Tisha Lewis
(74) *Attorney, Agent, or Firm* — Knobbe, Martens, Olson & Bear, LLP

(57) ABSTRACT

The invention provides a continuously variable transmission (CVT) system comprising a transmission means, connected to an input shaft and comprising at least a driving gear capable of rotating around its center, said center capable of rotating around a center of a virtual trajectory; a gear ring, engaged with said driving gear, capable of eccentrically rotating around said center of said virtual trajectory; a blocking means, engaged with said gear ring, comprising a set of blocking elements adopted to block the rotation of said gear ring and which elements are suitable to move; and an output shaft, connected with said driving gear. The invention further provides the use of such a CVT system in large vehicles and windmills.

20 Claims, 10 Drawing Sheets

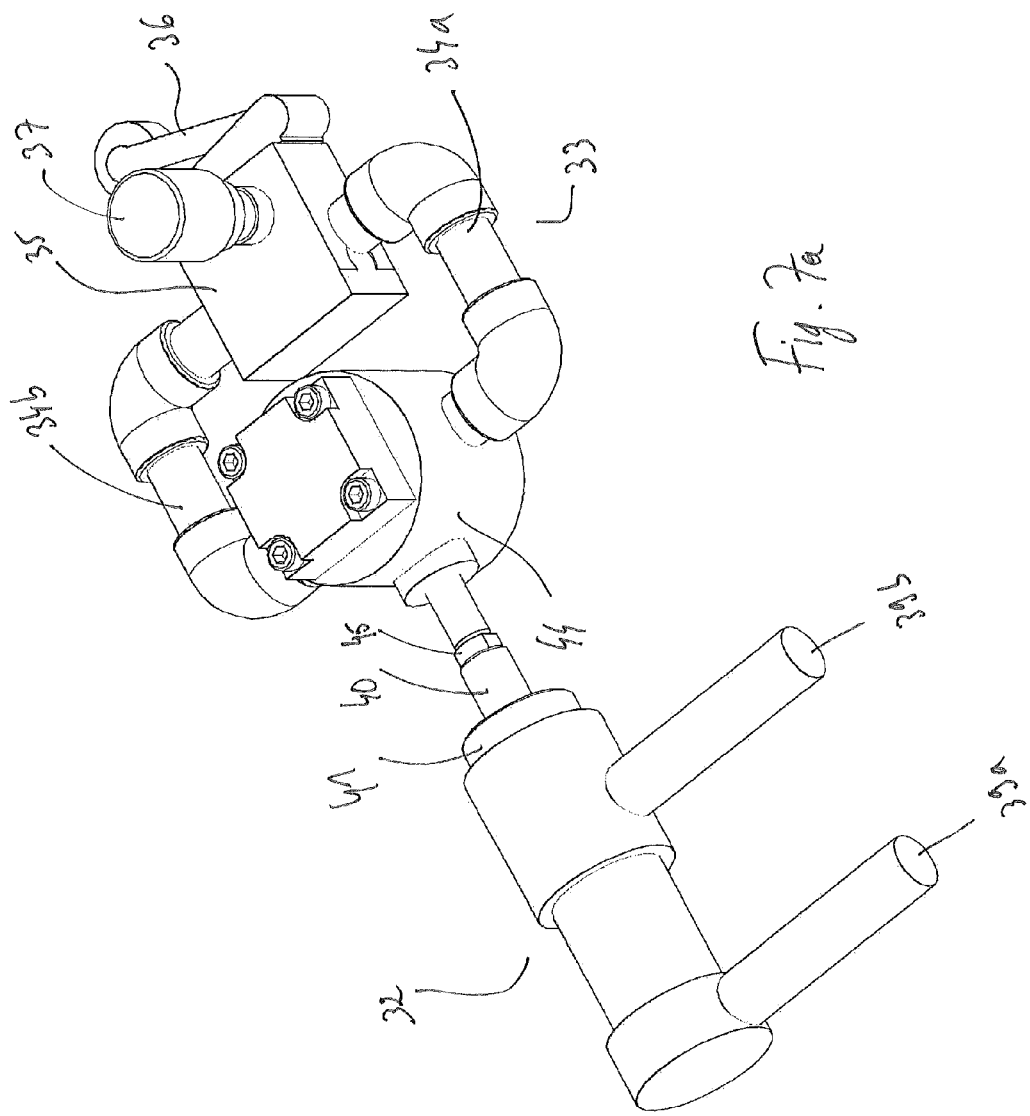

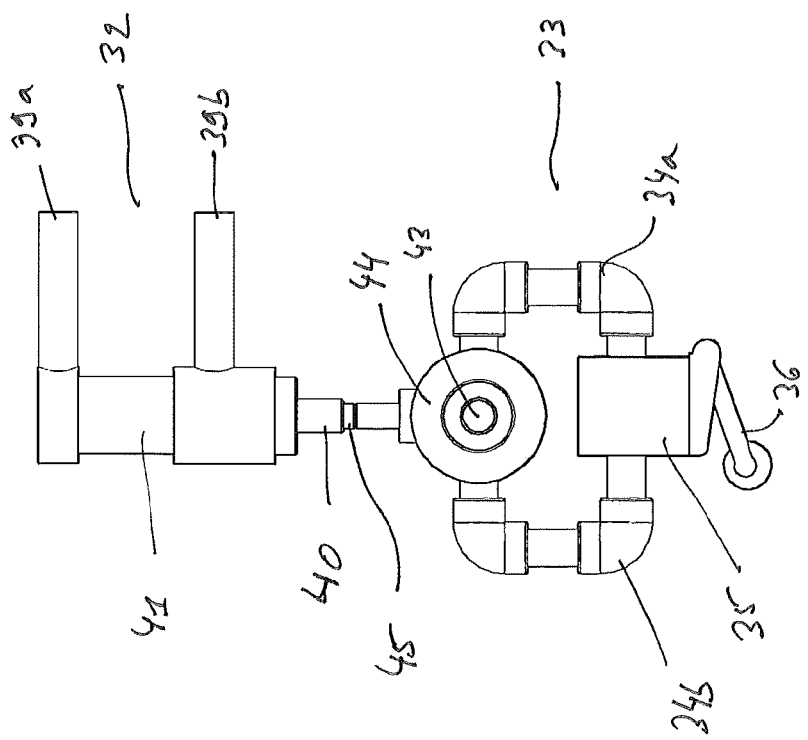

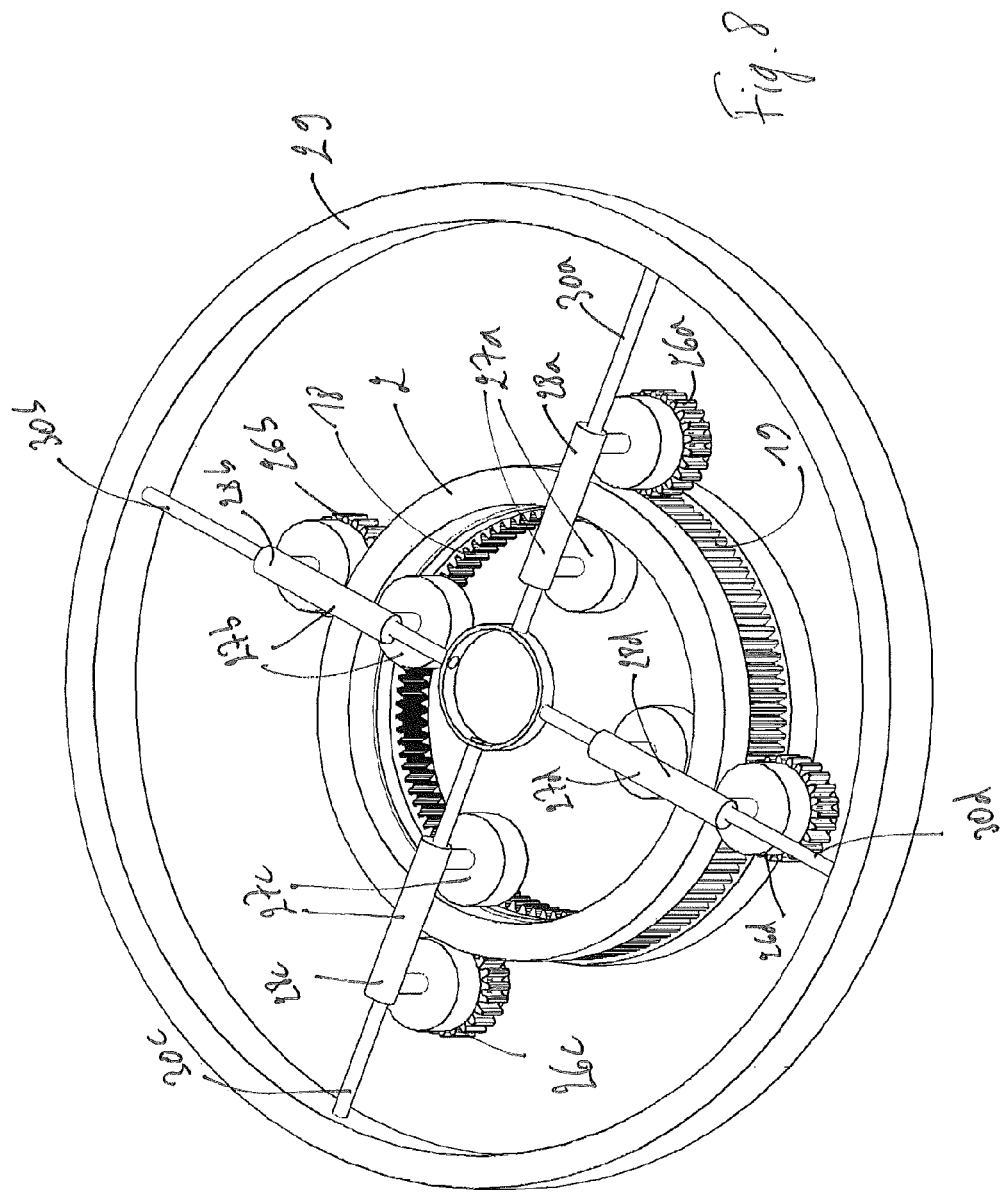

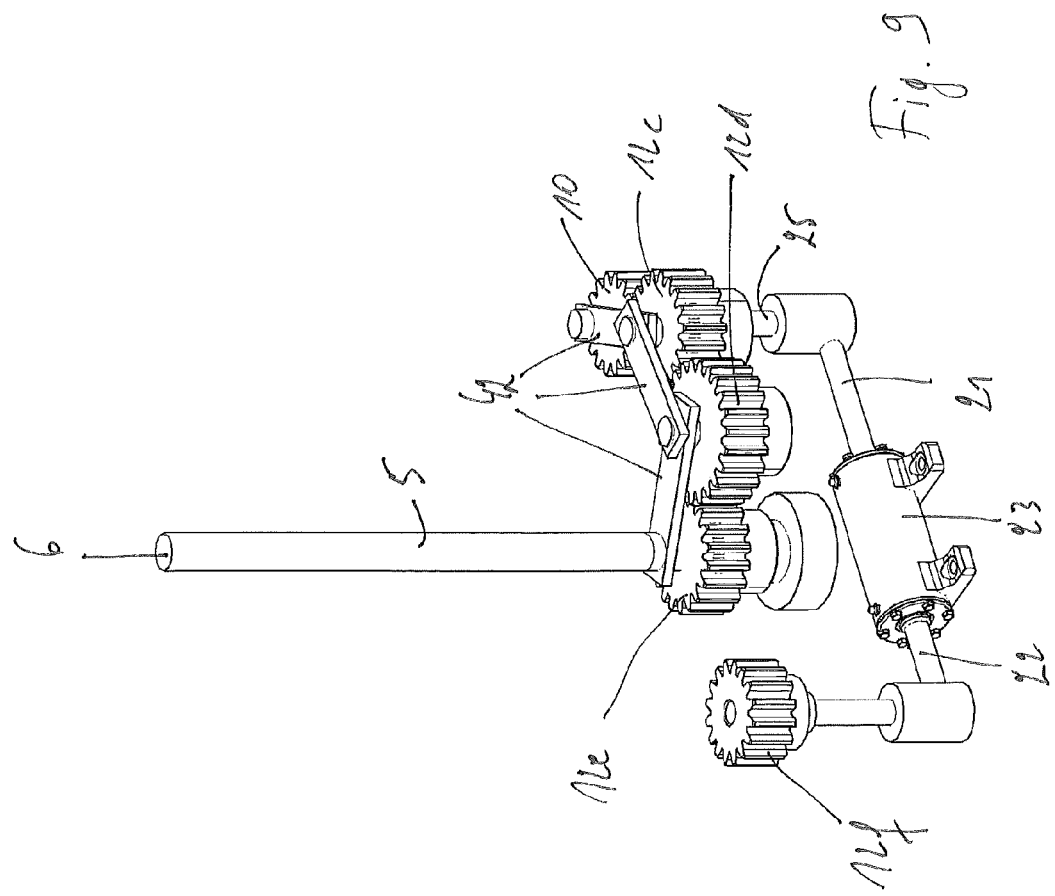

CONTINUOUS VARIABLE TRANSMISSION SYSTEM AND USE THEREOF

CROSS-REFERENCE TO RELATED APPLICATIONS

This application is the U.S. National Phase under 35 U.S.C. §371 of International Application PCT/EP2012/069426, filed Oct. 2, 2012, which claims priority to EP 11183736.5, filed Oct. 3, 2011.

TECHNICAL FIELD

The present invention relates to improvement of a continuously variable transmission (CVT) system for use in an automatic transmission for a vehicle. More in particular, the invention concerns a CVT system that is suitable for use in large vehicles, such as trucks.

BACKGROUND

Continuous variable transmission (CVT) is a user and environmentally friendly automatic type transmission that can be used in different industries as well as in transportation. In vehicles, the CVT causes automatic transmission by selecting the gear ratio that is the exact ratio needed for the road speed in which the vehicle is driven. Basically, the purpose of CVT is to continuously vary the transmission ratio. The idea of CVT is known for years; however, to date, its implementation in high power vehicles is cumbersome.

A number of different types of CVT have been developed in the past. Friction-based CVTs such as cone CVTs, transmit rotational movement between two wheels, at least one of which may vary in radius, using a transmission means such as a strap, which transfers the rotation by means of friction. Although easy in principle, the friction CVTs are incapable of transmitting the rotation at large torque or power because of the inherent slipping or skidding of the transmission means. Hydrostatic CVTs use a variable displacement pump and a hydraulic motor. All power is transmitted by hydraulic fluid. These types can generally transmit more torque, but can be sensitive to contamination. Some designs are also very expensive. A ratcheting CVT may vary the stroke of the reciprocating motion that is connected to a free wheel resulting in an unidirectional rotation. The drawback to ratcheting CVTs is undesired vibrations caused by the successive transition in speed required to accelerate an output shaft. Each mechanical system has its own inherent limitations.

At the early decades of the $20^{th}$ century, one concept of the continuous transmission was developed by H. van Doorne. An experimental version was built in a Lloyd LP400 in the fifty's and eventually the first cars were ordered and produced by the DAF company. Although the technology of CVT actually dates back decades, these types of transmissions did not penetrate the car industry and has until recently been limited mostly to smaller cars with transversely-mounted engines and front wheel drive. Only in the recent years, there are attempts to drive the CVT into the mainstream of the automobile industry.

Other transmissions were developed and another example is the CLAAS'CVT. Primary components of the HM transmission of CLAAS are a reverse unit, hydrostatic unit, double planetary gear and low and high speed coupler shafts, and a multistep reduction gear downstream of the coupler shaft. The power is split in the reverse unit into mechanical and hydro static paths.

Audi's engineers developed a multitronic CVT for years and now stating that the multitronic finally overcomes all the drawbacks of the stepless principles. This CVT is an improvement of the van Doorne CVT type based on chain V-belt principle. A key element of the multitronic is a variator that adopts a new transmission element called a link-plate chain made entirely from steel and is almost as flexible as V-belt so to handle high forces and torque levels of the A6's engine. However, after few years of employing the multitronic in Audi cars, reports from customers show that after a certain amount of mileage, the multitronic is experiencing failure.

In general, the currently known CVT systems are not capable of handling high power and/or torque, such as the power and torque of trucks. Another drawback of the currently known CVT systems is the loss of engine power to the hydraulic side systems for clamping the driving belt on the pulleys or adapting the position of system components. Another source of power loss is the slip of the belts that occurs in these systems. A further problem may be the undesired vibrations which can occur, e.g. in ratcheting CVTs, due to e.g. stepwise moving components.

The current invention aims to deal with at least part of aforementioned drawbacks and provides an improved CVT, suitable for use with high power engines, and with minimized power loss to hydraulic side systems and which reduces slip. Additionally, the CVT of the invention optimizes fuel consumption, thereby lowering the average fuel consumption and thus provides an economic and ecological positive effect.

SUMMARY OF THE INVENTION

It is an object of the present invention to provide a CVT that is not friction or hydraulic based.

It is another object of the present invention to provide a gear for a CVT that is adapted to transmit force and torque without slip and/or breakage.

It is yet another object of the present invention to provide a CVT that acts as an efficient transmission and can replace the conventional manually or automatics gears.

In a first aspect, the invention provides an improved CVT system comprising a gear ring, a transmission means comprising at least a driving gear, a blocking means comprising a set of blocking elements, an input shaft, and an output shaft.

In a preferred embodiment, the invention provides a CVT comprising a stabilizing gear, whereby said driving gear and said stabilizing gear grip into said gear ring at positions diametrically opposed to each other with respect to a center of said gear ring, said driving gear and stabilizing gear hereby capable of rotating, supporting and/or stabilizing said gear ring.

In a preferred embodiment, the force, which is used for blocking the gear ring by a blocking element, is chosen from the group of magnetic, electric, hydraulic and mechanical force.

In a preferred embodiment, at least one blocking element of the blocking means comprises at least one gear.

In a preferred embodiment, said output shaft and input shaft are on the same side of the gear ring. In another preferred embodiment, said output shaft and input shaft are each on another side of the gear ring.

In a preferred embodiment, said blocking means is at least partly and preferably completely positioned in the outer plane of the gear ring and the transmission means is positioned at least partly and preferably completely in the inner plane of the gear ring. In a preferred embodiment, said blocking means is positioned at least partly and preferably completely in the inner plane of the gear ring and the transmissions means is positioned at least partly and preferably completely in the outer plane of the gear ring. In another preferred embodiment, said blocking means is positioned at least partly and preferably completely in the same plane of the gear ring as the transmission means, either the inner plane or the outer plane.

In a preferred embodiment, at least one of said blocking elements of the blocking means can be moved by a force chosen from the group of: electric, mechanic, hydraulic, pneumatic or magnetic force.

In a preferred embodiment, at least part of said transmission means can be moved by a force chosen from the group of: electric, mechanic, hydraulic, pneumatic or magnetic force.

In a preferred embodiment, at least one of said elements of the blocking means comprise at least one gear connected to said gear ring, and a hydraulic circuit in which a liquid can be prevented from circulating by a mechanically actuated valve, whereby said blocking element is in a blocking state when said valve is closed and said liquid is prevented from circulating and whereby said blocking element is in an at least partially free or non-blocking state when said valve is at least partially open and said liquid can circulate in said circuit, said gear free to rotate when said liquid can circulate in said circuit and said gear at least partially prevented from rotating when said liquid is prevented from circulating in said circuit, thereby at least partially blocking or restraining said gear ring.

In a preferred embodiment, the CVT system comprises an electronic adjustment means for controlling the movement of at least one of the elements of the blocking means.

In a preferred embodiment, the CVT system comprises a number of guiding supports, which number preferably equals the number of elements of the blocking means, whereby said guiding supports are suitable to hook into the elements of the blocking means, thereby locking said elements into position In a second aspect, the invention relates to the use of such improved CVT as the transmission system in large vehicles and windmills.

DESCRIPTION OF FIGURES

FIG. 7a-7b show part of a blocking element of an example of a CVT system according to the present invention.

FIG. 8 shows a gear ring of an example of a CVT system according to the present invention, with gears of blocking elements and respective gear connecting means stabilized by the stabilization means with spokes through hollow bars of said gear connecting means.

FIG. 9 shows in detail part of the transmission means of an example of a CVT system according to the present invention, with the second cylinder controlling the position of the piston in this second cylinder and thus of its driving gear end and of its stabilizing gear end.

DETAILED DESCRIPTION OF THE INVENTION

Figure 1:
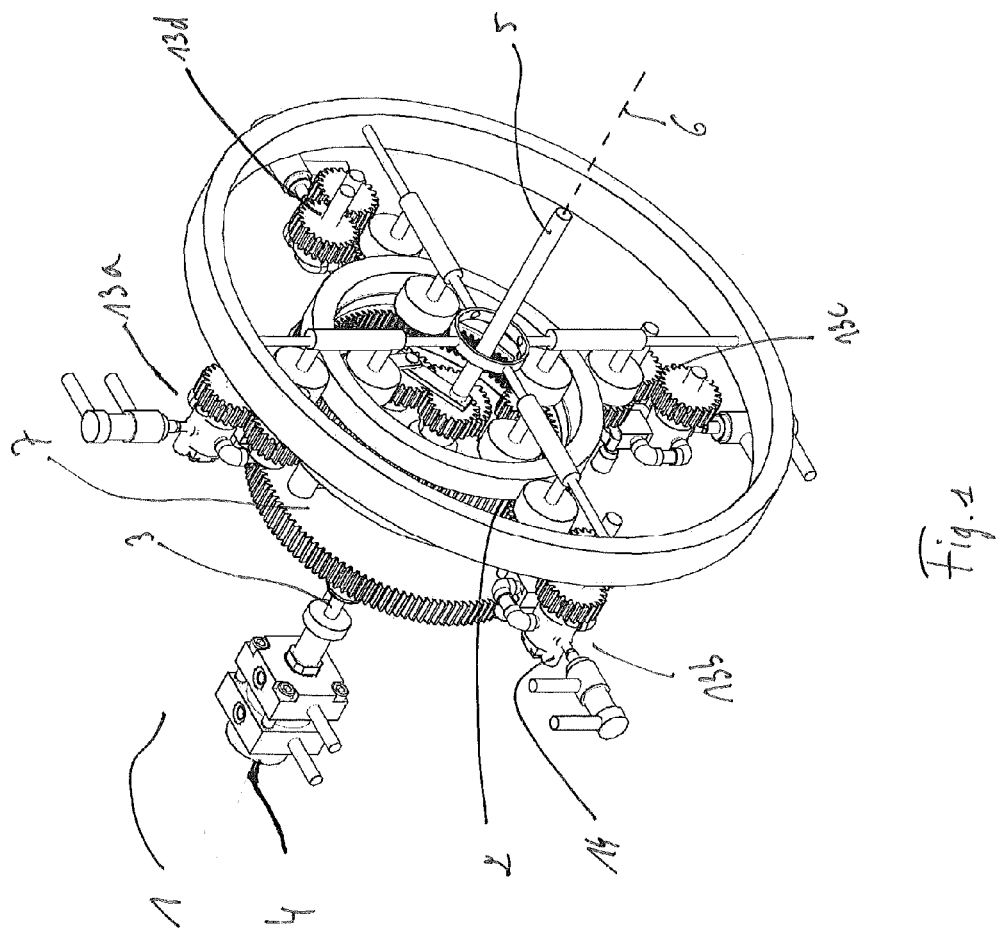
FIG. 1 shows a CVT according to the present invention, comprising a circular gear ring with inner teeth on its inner side and outer teeth on its outer side, and which is capable of rotating around its own center, and around a center of a virtual trajectory, which may be essentially circular.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight" (weight percent), here and throughout the description unless otherwise defined, refers to the relative weight of the respective component based on the overall weight of the formulation.

The present invention provides a novel and unique CVT that is rendered with numerous advantages relative to existing traditional transmissions. Among the advantages especially in vehicles there are the constant and stepless acceleration, the engine is working on optimal power range regardless the speed, better response to changes in road conditions, less power loss, and more. The mechanical version of the CVT deals with either frictional based CVT-the pulleys and V-belt CVT or the toroidal CVT that works by varying the radius of the contact point between two rotating objects. The hydraulic version of the CVT uses pump or pumps to vary the hydraulic fluid flow. The mechanism of the CVT of the present invention does not involve friction nor is it hydraulically based but it uses a central gear ring which can move along a virtual path with a variable perimeter. Using a central gear ring, and using gears in general, ensures the absence of skidding in the transmission, hereby allowing larger torques and power to be applied to the transmission according to the present invention, as compared with prior art CVTs based on friction, hydraulics, etc.

In a first aspect, the invention provides a continuously variable transmission (CVT) system comprising:
- a transmission means, connected to an input shaft and comprising at least a driving gear capable of rotating around its center, said center capable of rotating around a center of a virtual trajectory;
- a gear ring, engaged with said driving gear, capable of, preferably eccentrically, rotating around said center of said virtual trajectory;
- a blocking means, engaged with said gear ring, comprising a set of blocking elements adopted to block the rotation of said gear ring and which elements are suitable to move;
- an output shaft, connected with said driving gear.

Gear Ring

The central part of the invention is the gear ring. A preferred embodiment of a gear ring according to the invention comprises an inner ring of teeth and an outer ring of teeth. By preference, the gear ring is not mounted on a shaft and is suitable to move freely. In a preferred embodiment of the invention, the gear ring is suitable to rotate around its center. In a preferred embodiment of the invention, the gear ring is arranged between the blocking elements and the transmission means.

Transmission Means

As described herein, by the term "transmission means" is meant a set of components suitable for transmitting rotational movement from an input to an output, preferably comprising a sheath, preferably comprising a set of gears and preferably connected to an input shaft and/or output shaft. In a preferred embodiment of the invention, at least part of the transmission means is rotatably connected to the input shaft. Said input shaft is capable of rotating under the influence of a power source, such as an engine, and forces the transmission means or at least some of its components to rotate. In a preferred embodiment of the invention, the transmission means comprise at least a driving gear. The driving gear, and more in particular its center, is capable of following a virtual trajectory. During use, the driving gear can thus follow this virtual trajectory. In a preferred embodiment, the transmission means comprise one or more stabilizing gears, whereby said driving gear and at least one of said stabilizing gears grip into said gear ring, preferably at positions diametrically opposed to each other with respect to a center of said gear ring, said driving gear and stabilizing gears hereby capable of rotating, supporting and/or stabilizing said gear ring. The stabilizing gear or gears reduce possible undesired oscillations, nutations or wobblings of the gear ring, while not preventing it from describing its trajectory. Preferably, the centers of the driving gear and stabilizing gears do not move with respect to each other. In a preferred embodiment of the invention, the position of said driving gear and/or stabilizing gears can be altered, hereby altering the virtual trajectory. Said change in position can be driven by a force chosen from the group of: electric, mechanic, hydraulic, pneumatic or magnetic force, or any combination thereof. Therefore, in a preferred embodiment, the transmission means comprise an electrical, mechanical, hydraulic, pneumatic, magnetic actuator, and/or any combination thereof, for changing the position of the driving gear, more in particular, for changing the distance between the center of the driving gear and the center of the virtual trajectory.

In an embodiment of the invention, the transmission means comprises 1, 2, 3, 4, 5, 6, 7, 8, 9, 10 or more gears. Said gears can be made of gearwheels having different diameters and mesh one with another.

In one embodiment, the transmission means comprises at least three gears, whereby the input shaft is connected to one of the gears other than the driving gear.

In a preferred embodiment, the driving gear meshes with the gear ring. In one embodiment, the driving gear meshes on the inner ring of teeth, in another embodiment, the driving gear meshes with the outer ring of teeth. By preference, the transmission means is suitable to rotate over one of the rings (inner or outer) of the gear ring.

In a preferred embodiment of the invention, the driving gear is connected with the output shaft and is suitable to force the output shaft to rotate.

Blocking Means

By the term "blocking means" is meant a means that is adopted to block the rotation of the gear ring and guide the movement of the gear ring. In a preferred embodiment of the invention, the blocking means comprises a set of blocking elements. In an embodiment of the invention, the blocking means comprises 1, 2, 3, 4, 5, 6, 7, 8, 9, 10, 11, 12, 13, 14, 15 or more blocking elements. In one embodiment of the invention, blocking elements comprise 1, 2, 4, 6 or an even number of gears higher than 6 and/or blocking elements comprise 3, 5, 7 or an odd numbers of gears higher than 7. More blocking elements provide a better stabilization and smoother virtual trajectory to the gear ring and driving gear. Less blocking elements make the CVT cheaper and more compact. Preferably, the blocking means comprise at least 2, more preferably at least 3, most preferably between 6 and 12 blocking elements, e.g. 8 blocking elements. More gears per blocking element increase the smoothness of the virtual trajectory. Less gears per blocking element decrease the size and price of the CVT. Preferably, a blocking element comprises 3 or 4 gears. In a more preferred embodiment, at least one gear of said blocking elements is always in contact with said gear ring. This ensures that there is no mismatch of meshes between the blocking elements and the gear ring: if the gear ring is allowed to loose contact with one of the blocking elements, teeth of the gear ring may not grip correctly into teeth of the blocking elements, the next time the gear ring makes contact with that blocking element. In order to ensure that one gear of a blocking element always makes contact with the gear ring, and this in a stable way, in a particularly preferred embodiment, the CVT comprises a number of guiding supports, which number preferably equals the number of elements of the blocking means, whereby said guiding supports are suitable to hook into the elements of the blocking means, thereby locking said elements into position.

In a preferred embodiment of the invention, the force, which is used for blocking the gear ring by a blocking element, is chosen from the group of magnetic, electric, hydraulic and mechanical force or any combination thereof. Therefore, in a preferred embodiment, at least one blocking element comprises magnetic, electrical, hydraulic and/or mechanical blocking mechanisms, and/or any combination thereof, for at least partly restraining or blocking the gear ring. More preferably, said force is a combination of a mechanical and hydraulic force. Even more preferably, at least one blocking element comprises a hydraulic circuit in which a liquid can be prevented from circulating by a, preferably mechanically, actuated valve, whereby said blocking element is in a blocking state when said valve is closed and said liquid is prevented from circulating and whereby said blocking element is in an at least partially free or non-blocking state when said valve is at least partially open and said liquid can circulate in said circuit, whereby said blocking element comprises at least one gear which is free to rotate when said liquid can circulate in said circuit and which is at least partially prevented from rotating when said liquid is prevented from circulating in said circuit, said gear connected to said gear ring, said gear thereby at least partially blocking or restraining said gear ring. Using a hydraulic circuit allows a fast, friction-poor or even frictionless, and stable or firm blocking action. The valve is preferably mechanical such that it can be operated by a mechanical part of the CVT itself, without necessity of extra components.

In a preferred embodiment, the force, which is used for blocking the gear ring by a blocking element, is a mechanical force. More preferably, said elements of the blocking means comprise at least two gears, which are all joint with each other in such way that whenever two gears of the same element are touching the gear ring at the same time, the element comprising said gears is capable of blocking the movement of the gear ring.

In a preferred embodiment of the invention, each blocking element is adapted to move independently of the other blocking elements. Said movement can be driven by a force chosen from the group of: electric, mechanic, hydraulic, pneumatic or magnetic force. Therefore, in a preferred embodiment, at least one blocking element, comprises an electric, mechanical, hydraulic, pneumatic, magnetic actuator and/or any combination thereof. More preferably, said movement can be driven by a hydraulic actuator, which is preferably electrically or electronically controlled.

In a preferred embodiment of the invention, the CVT comprises an electronic adjustment means for controlling the movement of at least one of the elements of the blocking means. Such electronic adjustment means can be used to control the position of the blocking elements and therefore also possibly the virtual trajectory. Furthermore, the electronic adjustment means can be used to put the blocking elements from a blocking state into a free state or vice versa, if this would be deemed necessary.

CVT System

The combination of the rotating transmission means and the blocking action of the blocking elements makes the gear ring rotate around its center and either eccentrically or non-eccentrically, around the center of a virtual trajectory of the driving gear. Preferably, the transmission means comprise a stabilizing gear connected to the gear ring and capable of rolling over teeth of said gear ring, said stabilizing gear preferably positioned diametrically to said driving with respect to the gear ring. Such a stabilizing gear stabilizes the gear ring with respect to the driving gear and the virtual trajectory, thereby reducing possible undesired vibrations or variations in transmission coefficient.

In a preferred embodiment, said output shaft and input shaft are on the same side of the gear ring. In another preferred embodiment, said output shaft and input shaft are each on another side of the gear ring. In another preferred embodiment, said output shaft extends on both side of the gear ring. The choice of the position of the input and output shafts with respect to the gear ring may depend on the application in which the CVT is used. Usually, the input shaft will be connected to an engine on one side of the gear ring. The output shaft can be connected to e.g. further transmission systems, on either or both sides of the gear ring.

In a preferred embodiment, said blocking means are at least partly positioned in the outer plane of the gear ring and the transmission means are at least partly positioned in the inner plane of the gear ring. The blocking means can as such provide better or extra support, and the CVT can be kept compact since the transmission means are inside the gear ring.

In a preferred embodiment, said blocking means are at least partly positioned in the inner plane of the gear ring and the transmissions means are at least partly positioned in the outer plane of the gear ring. The transmission means can as such provide better or extra support, and the CVT can be kept compact since the blocking means are inside the gear ring.

In a preferred embodiment, said blocking means are positioned at least partly in the same plane of the gear ring as the transmission means, either the inner plane, whereby the CVT can be kept compact, or the outer plane, whereby they can provide extra or better support.

In some cases, it may be preferred to keep the gear ring small, whereby it may be beneficial to put the blocking means and/or transmission means at least partly outside of the gear ring.

Principle of Operation

The driving gear describes a virtual trajectory while it rolls over teeth of the gear ring. The virtual trajectory, as understood in this document, is the trajectory which the center of the driving gear describes during use of the CVT. The trajectory is called 'virtual' since there is not a fixed frame which defines the trajectory. Rather, it is determined by the position of the blocking means and the eccentricity of the gear ring with respect to the center of the virtual trajectory. The virtual trajectory, and more particularly its length and/or curvature, is crucial for controlling the transmission coefficient in a continuously variable manner.

Use of gear ring, driving gear, and a virtual trajectory in contrast with a real trajectory as in prior art, makes it possible to have a CVT with gears and thus without slipping or skidding and the possibility of using this CVT with large input and output torques and power.

The CVT according the present does not involve stepwise moving components such as in ratcheting CVTs. The gear ring, which may rotate eccentrically around the center of the virtual trajectory and around its own center, is also moving fluently, i.e. not stepwise, because it is blocked most of the time only by one blocking element at one point which is still allowed to move, hereby allowing the gear ring to rotate smoothly, and sometimes by two blocking elements at two points. The points where the blocking elements block the gear ring may, however, still be allowed to move, or the blocking elements may comprise an actuator which is able to adjust the position of the blocking points such that the gear ring moves smoothly, i.e. without undesired vibrations. Also, the number and position of the blocking elements can be adjusted in order for the virtual trajectory to be essentially circular or at least smooth, i.e. reducing undesired deviations from the ideal virtual trajectory. The nature of the blocking systems can be chosen in function of the application. They may comprise hydraulic, pneumatic, electrical, electronic, mechanical, magnetic, electromechanical, electromagnetic, etc. blocking means, or any combination thereof.

The eccentricity of the gear ring may be controlled in a number of ways, by controlling the position of the blocking means and/or by controlling the position of the driving gear and/or stabilizing gear. Preferably the transmission means comprise an electrical, mechanical, hydraulic, pneumatic or magnetic actuator or any combination thereof for changing the position of at least parts of the transmission means, i.e. preferably said transmission means can be at least partly moved by a force chosen from the group of: electric, mechanic, hydraulic, pneumatic or magnetic force. In a more preferred embodiment, said transmission means comprise at least three gears which are all joint with each other, i.e. the transmission means comprise at least three gears with the same mesh, one of said three gears connected to the other two.

The CVT system of the present invention may be combined with a differential and/or one or more gearboxes in order to provide the revolution speeds and/or transmission coefficients which are deemed necessary for certain applications. Furthermore, this CVT system, with or without differential and/or gearboxes, may be combined with a torque converter, e.g. to avoid shocks during a start phase, i.e. the initial moments when a torque or load is transmitted or applied.

The invention is further described by the following non-limiting examples which further illustrate the invention, and are not intended to, nor should they be interpreted to, limit the scope of the invention.

It is supposed that the present invention is not restricted to any form of realization described previously and that some modifications can be added to the presented example of fabrication without reappraisal of the appended claims.

EXAMPLES

FIG. 1 shows a CVT (1) comprising a circular gear ring (2) with inner teeth (18) on its inner side and outer teeth (19) on its outer side, and which is capable of rotating around its own center (17), and around a center (16) of a virtual trajectory (15), which may be essentially circular. The CVT (1) comprises transmission means (7) and blocking means (13) with, in this example, 4 blocking elements (13a-d). The CVT (1) comprises an output shaft (5) which can rotate around its axis (6) and which may be connected to a load. Each blocking element (13a-d) is provided with a hydraulic actuator (14).

Figure 2:
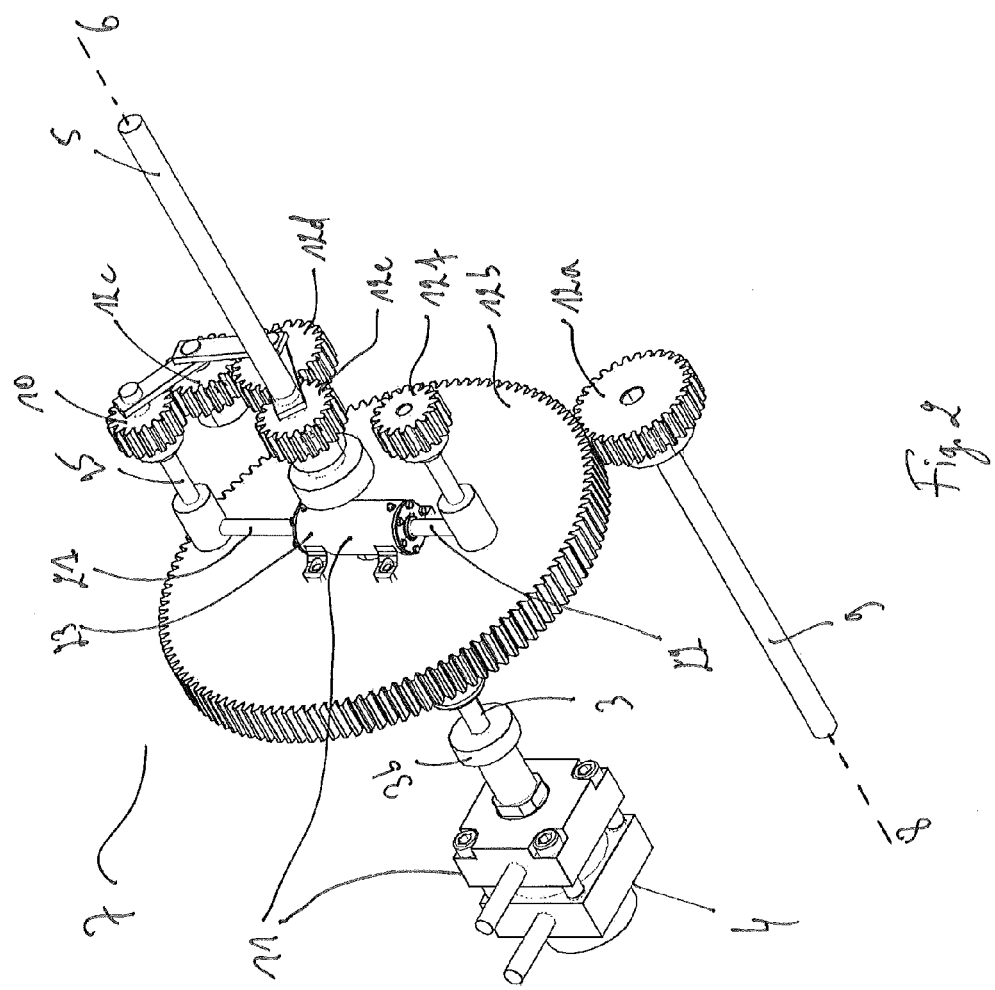
FIG. 2 shows the transmission means of an example of the invention in more detail.

FIG. 2 shows the transmission means (7) of the present example of the invention in more detail. The transmission means (7) comprises a set of gears (12a-f) connected to the input (8) via an input shaft (9) and a first transmission gear (12a) fixed on the input shaft (9); the first transmission gear transmits a rotation to a second, larger, transmission gear (12b), which can be mounted on a transmission piston with rod (3), this piston with rod (3) rotating with transmission gear (12b), but connected, e.g. via another, non-rotatable piston and a bearing (3b), to a hydraulic eccentricity actuator (4) which is capable of moving the transmission piston (3) along its longitudinal direction and with respect to a cylinder (20) attached to the second transmission gear (12b), the cylinder (20) capable of rotating around the piston (3). The transmission means (7) also comprise a hydraulic driving gear positioning means (11) which comprises said transmission piston (3), the cylinder (20) and said eccentricity actuator (4), but also a second cylinder (23), a piston with a rod at a driving gear end (21) and a rod at a stabilizing gear end (22), the piston dividing the cylinder (23) into two separate compartments. The eccentricity actuator (4) may push the transmission piston (3) in or out of the cylinder (20). Due to positioning tubes (24a-b) which hydraulically connect the ends of the cylinder (20) with respective ends of the second cylinder (23), a change in position of the transmission piston (3) results in a change of the driving gear end (21) and of the stabilizing gear end (22) of the piston rod, but in such a way that the distance between driving gear (10) and stabilizing gear (12f) which are mounted on the piston rod at the driving gear end (21) and stabilizing gear end (22) respectively, remains the same. Furthermore, this distance is such that driving gear (10) and stabilizing gear (12f) grip with their teeth into the inner teeth (18) of the gear ring (2) at diametrically opposed positions. As such, the eccentricity actuator (4) controls the eccentricity of the gear ring (2) with respect to the output axis (6) and thus the length of the virtual trajectory (15). Stability of the gear ring (2) is ensured by the fixed distance between driving gear (10) and stabilizing gear (12f), also when the gear ring (2) is oriented vertically or slanted. When the input shaft (9) is turned, the first transmission gear (12a) transmits rotation to the second transmission gear (12b) mounted on the driving gear positioning means (11). The pivot axis (25) of the driving gear (10), also mounted on the driving gear positioning means (11) via the driving gear end (21) of the piston rod, rotates along with the second transmission gear (12b), whereby the driving gear (10) rotates because it rolls over the inner teeth (18) of the gear ring (2) which can be at least partly blocked by the blocking means (13). The rotation of the driving gear (10) is further transmitted to the output shaft (5) by means of a third (12c), a fourth (12d) and a fifth (12e) transmission gear. The transmission coefficient between input revolution speed and output revolution speed is controlled by the length of the virtual trajectory, and can thus be continuously varied by controlling the hydraulic eccentricity actuator (4).

Figure 3:
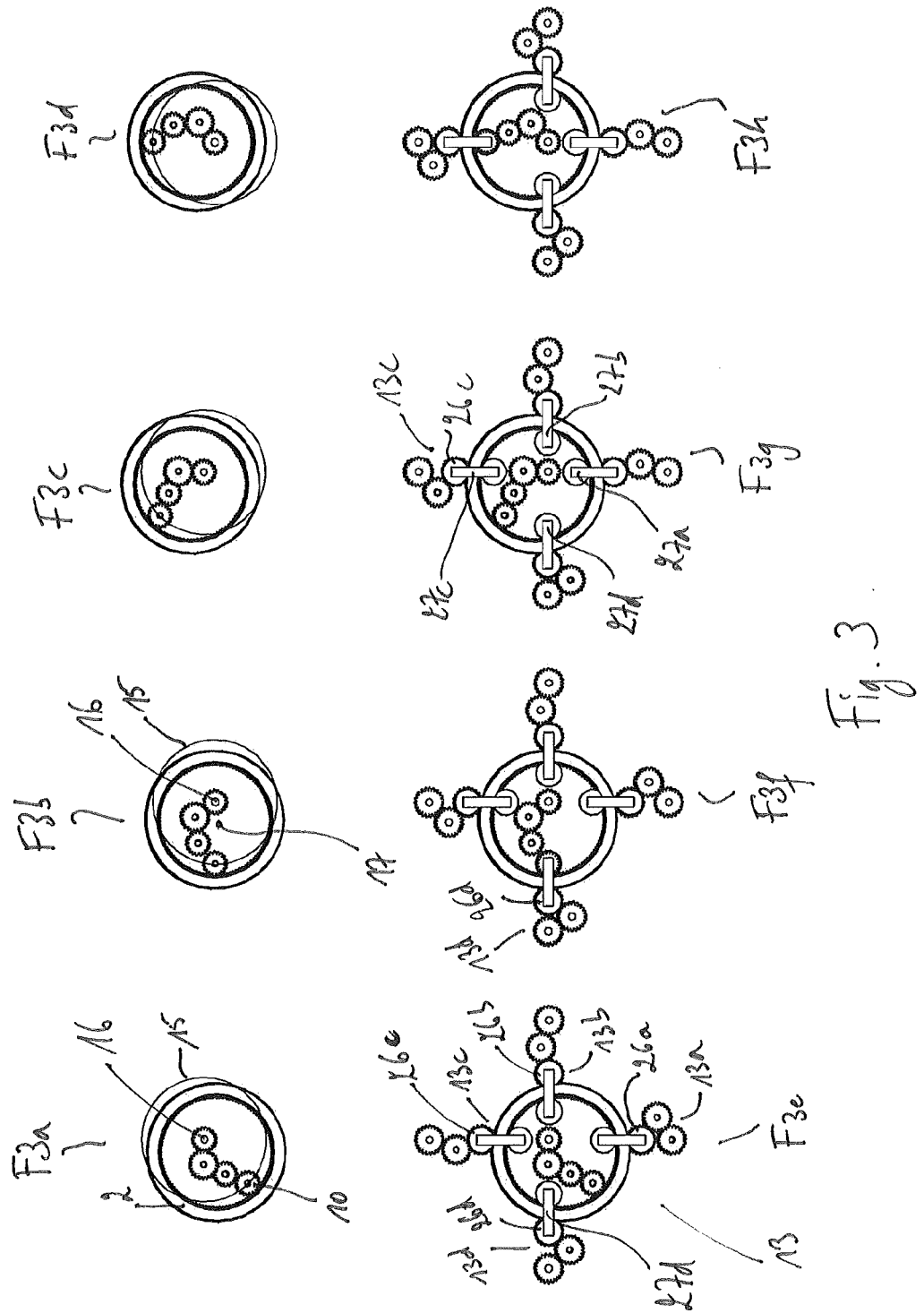
FIG. 3 shows the virtual trajectory of an example of a CVT system according to the present invention with respect to the gear ring and gears for different positions of the gear ring during operation, and the corresponding positions of the blocking elements of the blocking means.

FIG. 3 shows the virtual trajectory (15) with respect to the gear ring (2) and gears (10, 12c, 12d, 12f) for different positions of the gear ring (2) during operation, and the corresponding positions of the blocking elements (13a-d) of the blocking means (13). The essentially circular virtual trajectory (15) with center (16) is shown and remains fixed, i.e. the center does not change with respect to the input and output shafts, and the gears (10, 12c, 12d, 12f) and gear ring (2) are shown in different positions (F3a-F3d) with respect to the virtual trajectory (15). The corresponding positions (F3e-F3h) of the blocking means (13) and four blocking elements (13a-d) are also shown. In position (F3a) and (F3e), the driving gear (10) is directed to the lower left, hereby ensuring that the gear ring (2) is also at the lower left of the virtual trajectory, and furthermore pushing the gear ring (2) against the lower blocking element (13a) completely and against the left blocking element (13d) partially. It should be noted that in this position, the blocking elements (13c) and (13b) are in a non-blocking state, i.e. the gears (26c) and (26b) are free to rotate. The gear ring (2) pushing against the lower blocking element (13a) completely, may ensure that this blocking element is in a blocking state, whereby the gear (26a) which grips into the outer teeth (19) of the gear ring (2) is prevented from rotating, thereby providing a fixed point over which the gear ring (2) can roll. When the driving gear (10) and gear ring (2) move from position (F3a) to (F3b), the gear ring will at a certain push against the left blocking element (13d) completely, which can then be put in a blocking state, i.e. the gear (26d) is then blocked and incapable of rotating, hereby providing a fixed point over which the gear ring (2) can roll. As the gear ring's outer teeth (19) now grip into the teeth of the blocked gear (26d), and the gear ring (2) is turning further towards position (F3f), the gear ring (2) stops pushing against blocking element (13a), hereby releasing gear (26a) from a blocked state. In position (F3b) and (F3f), the driving gear is directed towards the left of the virtual trajectory, and the gear ring (2) can roll over the blocked gear (26d) of blocking element (13d). When the driving gear is then turned further towards a upper left position (F3c) and (F3g), the gear ring (2) still rolls over the blocked gear (26d) until it pushes completely against upper blocking element (13c). At this moment, gear (26c) can be put in a blocking or blocked state, hereby providing a fixed point over which the gear ring (2) can roll, and so on for positions (F3c-F3d) and (F3g-F3h) and further. Note the gears (26a-d) always make contact, and grip into the outer teeth (19) of the gear ring (2), due to gear connecting means (27a-d) which in this case each comprise a wheel rolling over the inner side of the gear ring (2) and connected via a rigid bar to its respective gear (26a, 26b, 26c, 26d). This ensures that the outer teeth (19) always grip well into the teeth of the gears (26a-d), which would not be the case if e.g. the gears (26a-d) were allowed to loose contact with the gear ring (2), hereby allowing the possibility that the teeth of one of the gears (26a-d) would not mesh in correctly with the outer teeth (19) once the gear ring (2) would start pushing against that one of the gears (26a-d).

Figure 4:
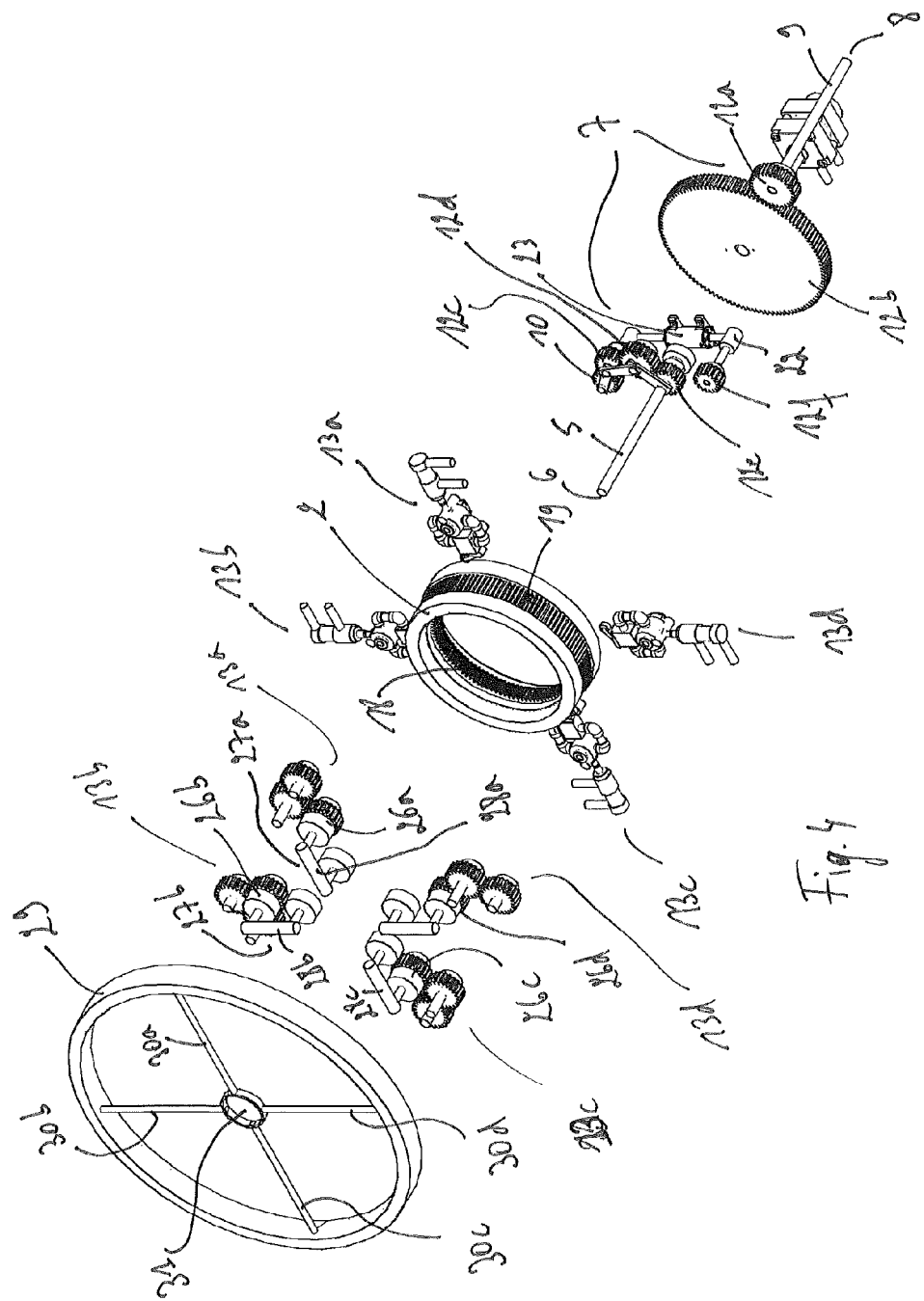
FIG. 4 shows different components of an example of a CVT system according to the present invention, whereby some of the components have been pulled apart for clarity.
Figure 5:
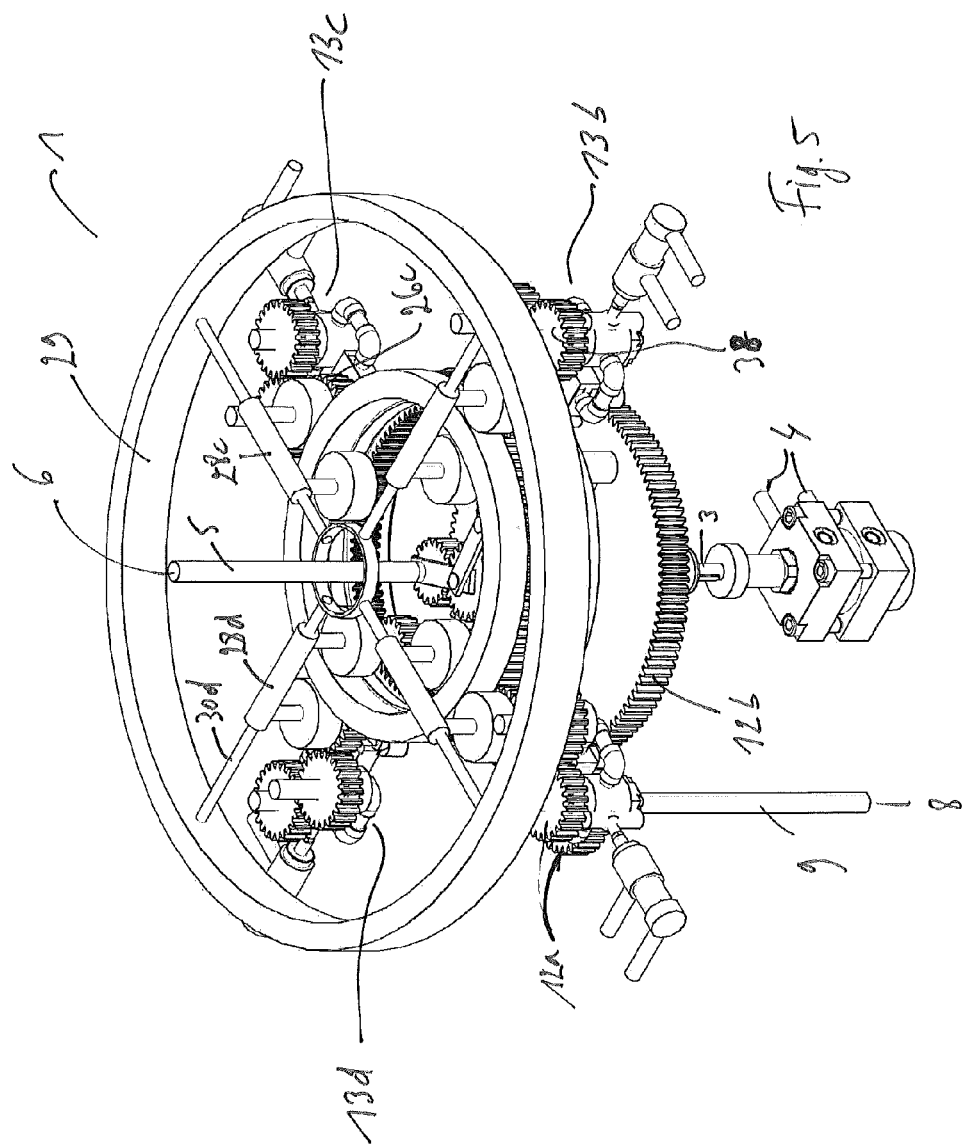
FIG. 5 shows the same components as in FIG. 4 when put together to form a CVT system according to the present invention.

FIG. 4 shows different components of the shown embodiment according to the present invention, whereby some of the components have been pulled apart for clarity. Shown are the input (8) and input shaft (9), transmission means (7) with the previously discussed system of gears and hydraulic eccentricity control system, the output (6) and output shaft (5), the gear ring (2) with blocking elements (13a-d), and with stabilization means (29). The stabilization means (29) comprise four spokes (30a-d) attached between an outer and an inner ring and acting as guiding supports, the inner ring comprising an opening (31) for the output shaft (5). The gear connecting means (27a-d) each comprise a rigid hollow bar (28a-d) though which spokes (30a-d) can be inserted, hereby providing stability to the gear connecting means (27a-d) of the blocking elements (13a-d), while still allowing radial movements of the gear connecting means (27a-d) and parts of the blocking elements (13a-d) with respect to the center (16) of the virtual trajectory (15). FIG. 5 shows the same components when put together to form a CVT (1) according to the present invention.

Figure 6:
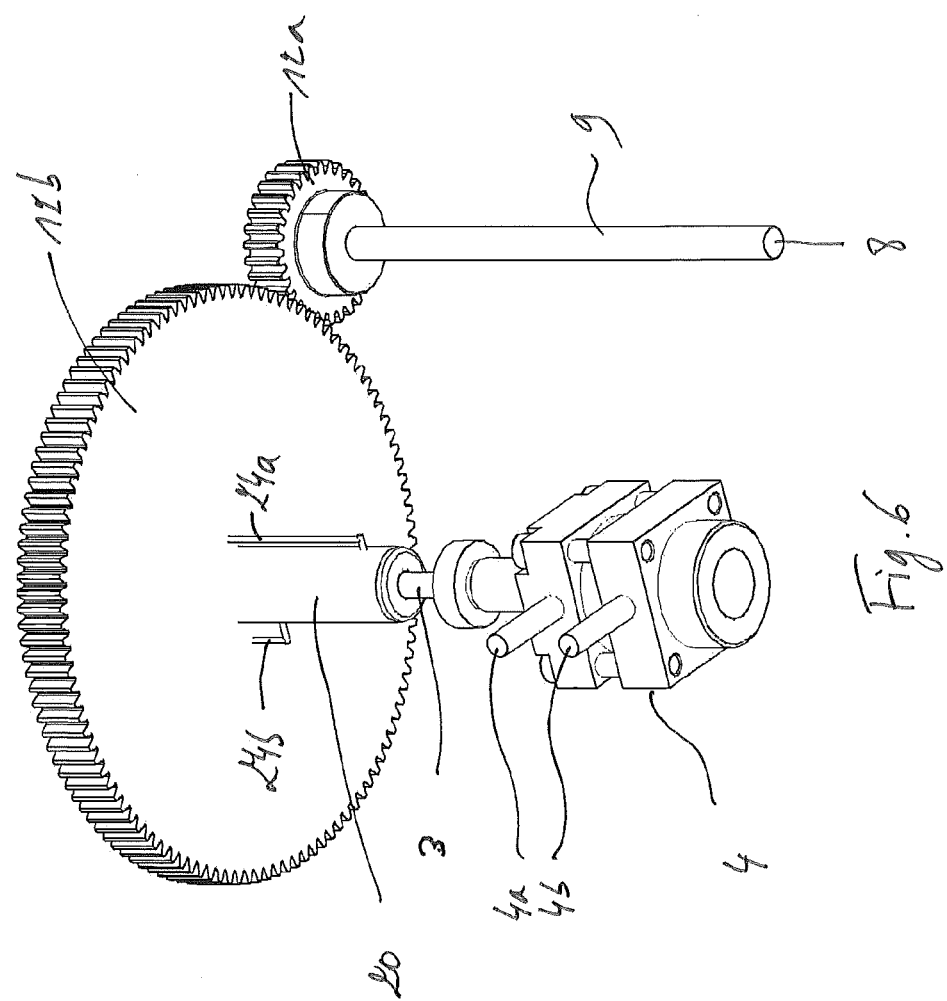
FIG. 6 shows in more detail the hydraulic eccentricity actuator of an example of a CVT system according to the present invention, with input and output tubes for the hydraulic fluid.

FIG. 6 shows the in more detail the hydraulic eccentricity actuator (4) with input and output tubes (4a-b) for the hydraulic fluid, the tubes e.g. connected to an electrically or electronically controlled pump which thus controls the position of the transmission piston (3).

FIGS. 7a-b show part of a blocking element. A blocking element as illustrated in this example, comprises a blocking positioning system (32) and a hydraulic circuit (33) comprising a set of tubes (34a-b), a current interrupter (35) with handle (36), and a gear box (44) containing a set of two meshed gears in a setup of a gear pump, whereby one of the gears is mounted on the pivot axis (43) of one of the gears (38) of the blocking element (see e.g. FIG. 5). The blocking positioning system (32) is hydraulic and has e.g. two tubes for liquid (39a-b) connected to a hydraulic pump which can be controlled e.g. electrically or electronically. The blocking positioning system (32) comprises a piston with rod (40) and a cylinder (41), the outer end of the piston rod (40) attached to the hydraulic circuit (33), e.g. via a screw or bolt (45) or other attachment means. Therefore, by controlling the movement and/or position of the piston (40) via the liquid's pressure in the tubes (39a-b), one can control the position of the hydraulic circuit (33) and thus also the position of at least one of the gears, e.g. (38), of the blocking element. Furthermore, the hydraulic circuit (33) can be locked, i.e. the liquid inside can be blocked from circulating, by pressing in the handle (36) which is connected to a valve inside the current interrupter (35). The hydraulic circuit comprises a gear box (44) with two gears gripping into each other and allowing the liquid to circulate only when the gears are free to rotate. The handle (36) may be used to prevent the liquid in the hydraulic circuit from circulating, hereby blocking the gears in the gear box (44), one of which is mounted on pivot axis (43) of a gear (38) of the blocking element. The handle (36) can be positioned such that it can be pressed in by the gear ring (2) when the driving gear (10) is at a certain position along its virtual trajectory. In a preferred embodiment, the handle (36), circuit interrupter (35) or the one of the gears (38) mounted on pivot axis (43) can be released from a blocked or blocking position, i.e. a position in which the handle (36) is pressed in and the one gear (38) is blocked, electrically, magnetically or electronically. This can be necessary when one wants to change the virtual trajectory and the gear ring (2) is at a position where it pushes against two of the handles (36) of two blocking elements, e.g. when (13a) and (13d) are blocked at the same time. In the latter case, one may only move at most one of the blocked elements unless one releases, preferably only partially, one of the blocked elements from a blocked state. Preferably this can be done by electrically or magnetically controlling the valve or handle (36) of the interrupter (35) via an electrical contact (37).

FIG. 8 shows a gear ring (2) with gears (26a-d) of blocking elements (13a-d) and respective gear connecting means (27a-d) stabilized by the stabilization means (29) with spokes (30a-d), acting as guiding supports, through hollow bars (28a-d) of said gear connecting means (27a-d).

FIG. 9 shows in detail part of the transmission means (7), with the second cylinder (23) controlling the position of the piston in this second cylinder (23) and thus of its driving gear end (21) and of its stabilizing gear end (22). The driving gear (10) is mounted on a pivot axis (25) which is mounted on the piston at its driving gear end (21). The stabilizing gear (12f) is mounted on a pivot axis which is mounted on the stabilizing gear end (22) of the piston rod. The rotation of the driving gear (10) can be transferred or transmitted to the rotation of a gear (12e) mounted on the output shaft (5) by a set of intermediate transmission gears (12c, 12d), the four gears (10, 12c-12e) held together by gear holding means (42), which in fact ensure that the driving gear is connected to the output shaft even when the position of the driving gear (10) is altered by the hydraulic eccentricity actuator (4) and hydraulic driving gear positioning means (11).

In a further example, the CVT can be connected to a differential and one or more gearboxes. An engine may be optimized with respect to power and/or torque at e.g. 1000 rpm. With a first gearbox, one may reduce the revolution speed to e.g. 10 rpm for e.g. gear 12b of the previous example. This means that the gear ring rotates around the center of the virtual trajectory at 10 rpm or once every 6 s, or the eccentric revolution speed is 10 rpm. Note that the gear ring also rotates around its own center. The transmission of the CVT may be the following:

in its minimal state, e.g. at minimal or vanishing eccentricity, it may be 10 between the eccentric revolution speed and output revolution speed (see e.g. the gears (10, 12c-e) in the previous example), in which case the output revolution speed is 100 rpm, and in its maximal state, e.g. at maximal eccentricity, it may be 12 between the eccentric revolution speed and output revolution speed (see e.g. the gears (10, 12c-e) in the previous example), in which case the output revolution speed is 120 rpm.

In this case the CVT has a transmission coefficient which may be varied continuously between 0.10 to 0.12, i.e. between 100 rpm/1000 rpm to 120 rpm/1000 rpm. With an extra gearbox the input revolution speed may be reduced to e.g. 100 rpm. By combining the CVT output (between 100 rpm and 120 rpm) and the reduced input (100 rpm) in a differential, on may obtain a revolution speed which may be varied continuously between 0 and 20 rpm. Using a final gear box with transmission coefficient 20, this may result in a continuously variable transmission coefficient between 0 rpm and 4000 rpm, which may be typically used in large vehicle such as trucks, trailers, tractors, busses, etc . . . .

When large torques is required, e.g. 4000 Nm in present-day trucks, one may increase the eccentricity revolution speed of the gear ring with a different first gearbox as above by e.g. a factor of 10, resulting in 100 rpm when the abovementioned numbers are used, hereby decreasing by a factor of 10 the forces which are necessary to provide the same torque. The output of the CVT system is then a revolution speed between 1000 rpm and 1200 rpm.

It should be noted that the invention is not limited to the examples described above, nor to the specific parameters used above.

What is claimed is:

1. A continuously variable transmission (CVT) system comprising
    a transmission means, connected to an input shaft and comprising at least a driving gear capable of rotating around its center, said center capable of rotating around a center of a virtual trajectory;
    a gear ring, engaged with said driving gear, capable of eccentrically rotating around said center of said virtual trajectory;
    a blocking means, engaged with said gear ring, comprising a set of blocking elements adopted to block the rotation of said gear ring and guide the movement of the gear ring, and which elements are suitable to move;
    an output shaft, connected with said driving gear;
    whereby the eccentricity of the gear ring is controlled by controlling the position of the blocking means and by controlling the position of the driving gear,
    wherein the CVT system comprises stabilizing means, whereby said driving gear grips into and said stabilizing means are connected to said gear ring, said driving gear and stabilizing means thereby capable of rotating, supporting and/or stabilizing said gear ring.

2. A CVT system according to claim 1, wherein said stabilizing means comprise a stabilizing gear, whereby said stabilizing gear grips into said gear ring at a positions diametrically opposed to said driving gear with respect to a center of said gear ring.

3. A CVT system according to claim 1, wherein the force, which is used for blocking the gear ring by a blocking element, is selected from the group consisting of magnetic, electric, hydraulic and mechanical force.

4. A CVT system according to claim 1, wherein at least one blocking element of the blocking means comprises at least one gear.

5. A CVT system according to claim 1, wherein said output shaft and input shaft are on the same side of the gear ring.

6. A CVT system according to claim 1, wherein said output shaft and input shaft are each on another side of the gear ring.

7. A CVT system according to claim 1, wherein said blocking means is positioned in the outer plane of the gear ring and the transmission means is positioned in the inner plane of the gear ring.

8. A CVT system according to claim 1, wherein said blocking means is positioned in the inner plane of the gear ring and the transmissions means is positioned in the outer plane of the gear ring.

9. A CVT system according to claim 1, wherein said blocking means is positioned in the same plane of the gear ring as the transmission means, either the inner plane or the outer plane.

10. A CVT system according to claim 1, wherein at least one of said blocking elements of the blocking means can be moved by a force selected from the group consisting of electric, mechanic, hydraulic, pneumatic and magnetic force.

11. A CVT system according to claim 1, wherein at least part of said transmission means can be moved by a force selected from the group consisting of electric, mechanic, hydraulic, pneumatic and magnetic force.

12. A CVT system according to claim 1, wherein at least one of said elements of the blocking means comprise at least one gear connected to said gear ring, and a hydraulic circuit in which a liquid can be prevented from circulating by a mechanically actuated valve, whereby said blocking element is in a blocking state when said valve is closed and said liquid is prevented from circulating and whereby said blocking element is in an at least partially free or non-blocking state when said valve is at least partially open and said liquid can circulate in said circuit, said gear free to rotate when said liquid can circulate in said circuit and said gear at least partially prevented from rotating when said liquid is prevented from circulating in said circuit, thereby at least partially blocking or restraining said gear ring.

13. A CVT system according to claim 1, comprising an electronic adjustment means for controlling the movement of at least one of the elements of the blocking means.

14. A CVT system according to claim 1, comprising a number of guiding supports, which number preferably equals the number of elements of the blocking means, whereby said guiding supports are suitable to hook into the elements of the blocking means, thereby locking said elements into position.

15. A continuously variable transmission (CVT) system comprising
    a transmission means, connected to an input shaft and comprising at least a driving gear capable of rotating around its center, said center capable of rotating around a center of a virtual trajectory;
    a gear ring, engaged with said driving gear, capable of eccentrically rotating around said center of said virtual trajectory;
    a blocking means, engaged with said gear ring, comprising a set of blocking elements adopted to block the rotation of said gear ring and guide the movement of the gear ring, and which elements are suitable to move;
    an output shaft, connected with said driving gear;
    whereby the eccentricity of the gear ring is controlled by controlling the position of the blocking means and by controlling the position of the driving gear,
    wherein said output shaft and input shaft are on the same side of the gear ring.

16. A CVT system according to claim 15, wherein the force, which is used for blocking the gear ring by a blocking element, is selected from the group consisting of magnetic, electric, hydraulic and mechanical force.

17. A CVT system according to claim 15, wherein at least one blocking element of the blocking means comprises at least one gear.

18. A continuously variable transmission (CVT) system comprising
- a transmission means, connected to an input shaft and comprising at least a driving gear capable of rotating around its center, said center capable of rotating around a center of a virtual trajectory;
- a gear ring, engaged with said driving gear, capable of eccentrically rotating around said center of said virtual trajectory;
- a blocking means, engaged with said gear ring, comprising a set of blocking elements adopted to block the rotation of said gear ring and guide the movement of the gear ring, and which elements are suitable to move;
- an output shaft, connected with said driving gear;
- whereby the eccentricity of the gear ring is controlled by controlling the position of the blocking means and by controlling the position of the driving gear, wherein at least one of said elements of the blocking means comprise at least one hydraulically blockable gear connected to said gear ring.

19. A CVT system according to claim 18, wherein said element of the blocking means comprises a hydraulic circuit in which a liquid can be prevented from circulating by a mechanically actuated valve, whereby said blocking element is in a blocking state when said valve is closed and said liquid is prevented from circulating and whereby said blocking element is in an at least partially free or non-blocking state when said valve is at least partially open and said liquid can circulate in said circuit, said gear free to rotate when said liquid can circulate in said circuit and said gear at least partially prevented from rotating when said liquid is prevented from circulating in said circuit, thereby at least partially blocking or restraining said gear.

20. A CVT system according to claim 18, wherein said output shaft and input shaft are on the same side of the gear ring or wherein said output shaft and input shaft are each on another side of the gear ring.

* * * * *